United States Patent
Cook et al.

(10) Patent No.: US 7,930,878 B2
(45) Date of Patent: Apr. 26, 2011

(54) METHOD AND APPARATUS FOR RAPIDLY THAWING FROZEN NOX REDUCTANT

(75) Inventors: David Cook, San Ramon, CA (US);
Furqan Zafar Shaikh, Troy, MI (US);
Michael Levin, Ann Arbor, MI (US);
David Furedy, Pittsburgh, PA (US);
Evan Kent Dawson, Houston, TX (US);
Daniel Kabat, Oxford, MI (US); Jeremy Keller, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 1033 days.

(21) Appl. No.: 11/679,206

(22) Filed: Feb. 27, 2007

(65) Prior Publication Data

US 2008/0202473 A1 Aug. 28, 2008

(51) Int. Cl.
*F01N 3/00* (2006.01)
*F01N 3/10* (2006.01)

(52) U.S. Cl. ............... 60/286; 60/274; 60/295; 60/301; 60/303

(58) Field of Classification Search ............... 60/274, 60/286, 295, 303, 273, 301; 122/512
See application file for complete search history.

(56) References Cited

U.S. PATENT DOCUMENTS

| | | | |
|---|---|---|---|
| 3,628,516 A | 12/1971 | Perrin | |
| 4,099,488 A | 7/1978 | Damon | |
| 4,805,571 A | 2/1989 | Humphrey | |
| 4,941,999 A | 7/1990 | Noisier | |
| 5,543,123 A | 8/1996 | Hofmann et al. | |
| 5,809,774 A | 9/1998 | Peter-Hoblyn et al. | |
| 5,884,475 A | 3/1999 | Hofmann et al. | |
| 5,976,475 A | 11/1999 | Peter-Hoblyn et al. | |
| 5,979,420 A | 11/1999 | Kawamura | |
| 6,063,350 A | 5/2000 | Tarabulski et al. | |
| 6,209,313 B1 | 4/2001 | Wissler et al. | |
| 6,223,526 B1 | 5/2001 | Wissler et al. | |
| 6,273,120 B1 | 8/2001 | Hofmann et al. | |
| 6,293,097 B1 | 9/2001 | Wu et al. | |

(Continued)

FOREIGN PATENT DOCUMENTS

DE    4432576    3/1996

(Continued)

OTHER PUBLICATIONS

Watlow Electric Manufacturing Company, "Cable Heaters", Archieved Jan. 27, 2001.*

(Continued)

*Primary Examiner* — Thomas E Denion
*Assistant Examiner* — Audrey Klasterka
(74) *Attorney, Agent, or Firm* — Damian Porcari; Brooks Kushman P.C.

(57) ABSTRACT

According to one aspect of the present invention, a liquid reductant tank for supplying liquid reductant to a selective catalytic reduction system is disclosed. The tank includes a tank cavity for holding a liquid reductant and being at least partially defined by one or more side walls; a liquid reductant supply line at least partially situated within the tank cavity and for communicating liquid reductant from the tank cavity to outside of the tank cavity; and a heating element situated at least partially within the liquid reductant supply line and for thawing frozen reductant situated within the supply line during cold start conditions to obtain liquid reductant for use in a selective catalytic reduction system.

5 Claims, 3 Drawing Sheets

U.S. PATENT DOCUMENTS

| | | |
|---|---|---|
| 6,314,722 B1 | 11/2001 | Matros et al. |
| 6,361,754 B1 | 3/2002 | Peter-Hoblyn et al. |
| 6,387,336 B2 | 5/2002 | Marko et al. |
| 6,497,851 B1 | 12/2002 | Hu et al. |
| 6,519,935 B2 | 2/2003 | Weigl |
| 6,810,661 B2 | 11/2004 | Lambert et al. |
| 6,901,748 B2 * | 6/2005 | Gomulka .................. 60/286 |
| 2003/0101715 A1 | 6/2003 | Huthwohl |
| 2004/0025498 A1 | 2/2004 | Lambert et al. |
| 2004/0103859 A1 | 6/2004 | Shetley |
| 2004/0226285 A1 | 11/2004 | Gomulka |
| 2005/0235632 A1 | 10/2005 | Tarabulski et al. |
| 2005/0252201 A1 | 11/2005 | Lecea et al. |
| 2007/0035832 A1 * | 2/2007 | Hirata et al. .................. 359/484 |
| 2007/0157602 A1 * | 7/2007 | Gschwind .................. 60/274 |
| 2007/0266699 A1 | 11/2007 | Ripper et al. |
| 2008/0041841 A1 * | 2/2008 | Tanaka et al. .................. 219/535 |

FOREIGN PATENT DOCUMENTS

| | | |
|---|---|---|
| DE | 19729003 | 2/1999 |
| DE | 19935920 | 3/2001 |
| DE | 20 2006 010 615 U1 | 10/2006 |
| DE | 10 2006 046 900 A1 | 4/2008 |
| EP | 0 321 085 A2 | 6/1989 |
| EP | 1 757 781 A1 | 2/2007 |
| JP | 2004353523 A | 12/2004 |
| JP | 2005-282413 A | 10/2005 |
| WO | 00/21881 A1 | 4/2000 |
| WO | 00/51360 A1 | 8/2000 |
| WO | 00/75643 A1 | 12/2000 |
| WO | 01/54044 A1 | 7/2001 |
| WO | WO 2005073527 A1 * | 8/2005 |
| WO | 2005/111387 A1 | 11/2005 |
| WO | 2006/034891 A1 | 4/2006 |
| WO | 2008/040592 A1 | 4/2008 |

OTHER PUBLICATIONS

Laura Freeman et al., "Freeze Protection of Onboard Urea Co-Fueling System", SAE Technical Paper Series 2006-01-0645, Apr. 3-6, 2006.

UK Search Report Dated May 22, 2008.

* cited by examiner

METHOD AND APPARATUS FOR RAPIDLY THAWING FROZEN NOX REDUCTANT

BACKGROUND OF THE INVENTION

1. Field of the Invention

One aspect of the present invention relates to a method and apparatus for rapidly thawing NOx reductant.

2. Background Art

While diesel and lean-burn gasoline engines are known to provide beneficial fuel economy, these engines also produce oxides of nitrogen (NOx) and particulates during normal operation. Combustion can be optimized to reduce exhaust emissions and obtain beneficial fuel economy. However, these measures may not be sufficient to bring NOx levels within current and proposed regulatory standards that impose limits on the NOx levels in engine emission streams. Selective catalytic reduction (SCR) methods are known for after treatment of the emissions stream to reduce NOx to acceptable regulatory levels.

SCR methods have been employed to remove NOx from diesel exhaust with a liquid reductant, such as aqueous urea. NOx and ammonia are brought into contact with a selective catalyst and catalytically converted into environmentally safe nitrogen and air. The liquid reductant is typically injected directly into the exhaust pipe, where it decomposes by thermal hydrolysis to ammonia and carbon dioxide. The ammonia stored on the surface of the SCR catalyst reacts with NOx compounds in the exhaust gases to reduce NOx compounds to nitrogen.

One disadvantage of liquid reductants is that freezing of the reductant may occur. The freezing temperature varies relative to the composition and concentration of the dissolved reductant. For example, solutions having a urea content of about 33% in water, typically freeze at about 12° F. (−11° C.). Liquid reductant freezing is particularly a problem for the use of diesel vehicles in cold-weather climates when a liquid reductant is employed to help meet emission standards for NOx. Moreover, regulations may require that urea is available in a liquid state, even at cold temperatures at engine start up, or within a relatively short amount of time from engine startup.

In light of the foregoing, what is needed is a method and system that employs liquid reductants for decreasing NOx emissions in cold weather climates without experiencing at least one of the above-identified disadvantages.

SUMMARY OF THE INVENTION

According to a first embodiment of the present invention, a liquid reductant tank for supplying liquid reductant, e.g. urea, to a selective catalytic reduction system (SCR) is disclosed. The tank includes a tank cavity for holding a liquid reductant and being at least partially defined by one or more side walls; a liquid reductant supply line at least partially situated within the tank cavity and for communicating liquid reductant from the tank cavity to outside of the tank cavity; and a heating element situated at least partially within the liquid reductant supply line and for thawing frozen reductant situated within the supply line during cold start conditions to obtain liquid reductant for use in a selective catalytic reduction system.

In at least one embodiment, the heating element is capable of thawing frozen reductant situated within and around the supply line during cold start conditions to obtain liquid reductant for use in a selective catalytic reduction system. The heating element can be a cable heater. The liquid reductant tank can further include a sump cavity for holding a portion of the liquid reductant and being at least partially defined by one or more sump side walls. The sump cavity is situated below the tank cavity. The liquid reductant supply line can be at least partially situated within the sump cavity and the tank cavity. A bulk heating element can be situated within the tank cavity for bulk heating of a portion of liquid and/or frozen reductant within the tank cavity.

According to a second embodiment of the present invention, a liquid reductant tank for supplying liquid reductant to a selective catalytic reduction system is disclosed. The liquid reductant tank includes a tank cavity for holding a liquid reductant and being at least partially defined by one or more side walls and a sump cavity for holding a portion of the liquid reductant and being at least partially defined by one or more sump side walls. The sump cavity is situated below the tank cavity. The tank further includes a sump heating element situated at least partially within the sump cavity for thawing frozen reductant situated within the sump cavity during cold start conditions to obtain liquid reductant for use in a selective catalytic reduction system.

The sump heating element can be a cable heater. The sump cable heater can be formed in a substantially coiled shape. In at least one embodiment, the sump heating element includes a cable heater; and a metal sheet. The cable heater can be spirally wound around the outer diameter of the substantially cylindrical metal sheet. The metal sheet can be a substantially cylindrical metal sheet. The metal sheet can be formed of stainless steel. The liquid reductant tank can further include a bulk heating element situated within the tank cavity for bulk heating of a portion of liquid and/or frozen reductant within the tank cavity.

According to a third embodiment of the present invention, a method for delivering liquid reductant to a selective catalytic reduction system is disclosed. The method includes detecting a cold start condition of a vehicle having a SCR system; determining a thawing period; during at least a portion of the thawing period, rapidly thawing frozen reductant contained within a reductant tank of the SCR system to obtain thawed liquid reductant; and delivering the thawed liquid reductant for use in the SCR system.

The delivering step can include dosing ammonia to the catalyst after the thawing period elapses. The thawing period can be between 1-5 minutes. The determining step can include determining a thawing period based on a catalyst temperature at the cold start condition and the minimal operating temperature for the catalyst. In another embodiment, the determining step includes determining a thawing period based on the rapid urea decomposition rate at the cold start condition and a minimal operating temperature for the urea.

DETAILED DESCRIPTION OF EMBODIMENTS OF THE PRESENT INVENTION

Except where expressly indicated, all numerical quantities in this description indicating amounts of material or conditions of reaction and/or use are to be understood as modified by the word "about" in describing the broadest scope of the present invention. Practice within the numerical limits stated is generally preferred.

Figure 1:
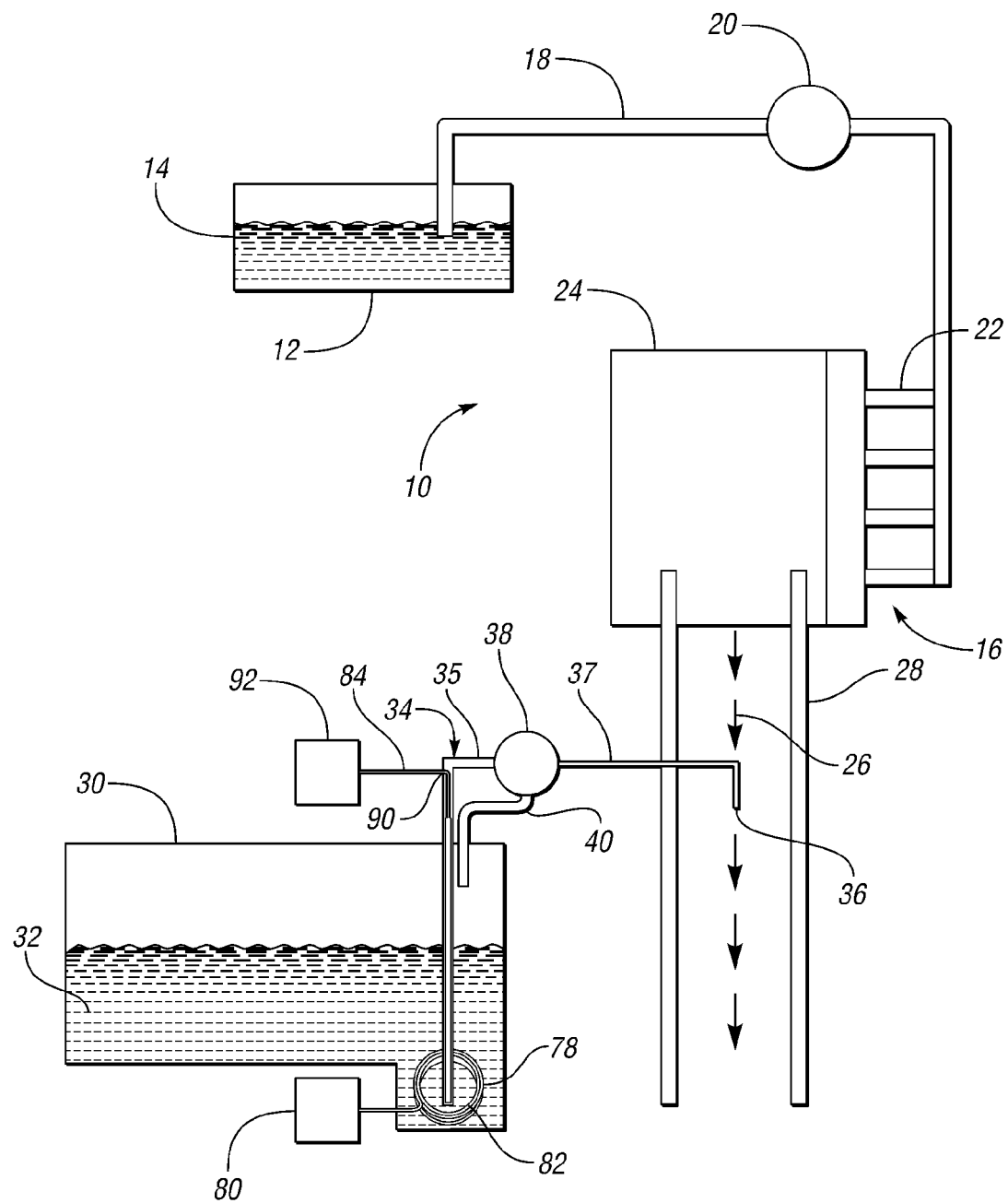
FIG. 1 is a general schematic arrangement of a fuel and liquid reductant delivery system according to one embodiment of the present invention.

FIG. 1 is a general schematic arrangement of a fuel and liquid reductant delivery system 10 according to one embodiment of the present invention. System 10 can be utilized with any engine capable of generating NOx emissions, for example internal combustion engines with high-pressure fuel injection systems.

As shown in FIG. 1, the system 10 includes a diesel fuel tank 12 for holding diesel fuel 14. The system 10 further includes a high-pressure fuel injection system 16 and a diesel fuel supply line 18 extending between and fluidly connecting the high pressure fuel injection system 16 and the diesel fuel tank 12.

A high-pressure fuel pump 20 can be disposed between the high-pressure fuel injection system 16 and the diesel fuel tank 12. The high-pressure fuel pump 20 pumps diesel fuel 14 from diesel fuel tank 12 to injectors 22 of the fuel injection system 16. A non-limiting example of a high-pressure fuel injection system 16 can be any high-pressure fuel injection system known to those skilled in the art.

Injectors 22 feed diesel fuel 14 into diesel engine 24, which combusts the diesel fuel 14, thereby producing exhaust gases 26 containing NOx. The exhaust gases pass through the exhaust gas pipe 28.

The system 10 further includes a reductant tank 30 for holding liquid reductant 32. Reductant supply line 34 connects the reductant tank 30 to the exhaust gas pipe 28. Reductant supply line 34 includes a suction side 35 for suctioning liquid reductant 32 from the reductant tank 30 and a pressure side 37 for delivering liquid reductant to an injection device 36 disposed at one end of the pressure side 37 to direct liquid reductant 32 into the exhaust gas pipe 28. In at least one embodiment, the suction side 35 typically has an internal diameter of 10 to 20 millimeters and the pressure side 37 typically has an internal diameter of less than or equal to 5 millimeters.

The outer surfaces of one or both sides 35 and 37 can be fitted with a heating hose to indirectly (i.e. the heat must travel through the width of the supply line) heat liquid reductant contained within one or both sides 35 and 37. For example, a heating hose can be utilized to prevent refreezing of liquid reductant in the pressure side 37 in relatively cold conditions. Moreover, the heating hose can be utilized to gradually melt frozen reductant in the suction and/or pressure sides. The heating hose is typically comprised of a heating element layer surrounded by a insulating material for limiting the escape of heat outward from the heating element and directing the heat towards the reductant supply line 34. When an insulating material is utilized, the current supplied to the heating element layer is limited to prevent overheating of the insulating material.

Reductant pump 38 pumps the liquid reductant 32 to the injection device 36. Reductant return line 40 directs unused or excess liquid reductant 32 to the reductant tank 30. Injection device 36 can dispense a liquid reductant, e.g. urea, directly or with compressed air into the NOx exhaust stream. After decomposition of the liquid reductant, for example, urea, ammonia and NOx are brought together into contact with a selective catalyst to catalytically convert the NOx into environmentally safe nitrogen and water.

Upon start up of a vehicle having an SCR system, the selective catalyst may not be ready to perform the catalytic conversion of NOx to nitrogen. For example, during cold start conditions, the catalyst temperature may be substantially lower than the operating temperature necessary for the catalyst to function. In such cases, the selective catalyst is heated to obtain the threshold operating temperature. During the heating operation, which can take between 1-5 minutes (i.e. start up time), ammonia cannot be injected or dosed into the exhaust stream because the selective catalyst is not ready for operation. Moreover, the liquid reductant is commonly not operational, i.e. not decomposed, during the start up time. Therefore, the heating operation is necessary in these instances to increase the exhaust stream temperature so that the urea can be decomposed into ammonia.

In at least one embodiment of the present invention, the liquid NOx reductant 32 is an aqueous solution of urea. Aqueous urea solutions and hydrolysis products formed therefrom can be used as a source of ammonia to effect reduction of the NOx. Aqueous solutions of urea can be employed up to the solubility limit of urea. Typically, the urea solution can contain 20 to 80 percent reagent based on the weight of the solution. In other embodiments, the concentration for mobile uses is about 32.5% urea by weight, which exhibits the lowest freezing point without urea precipitation prior to freezing.

In other embodiments of the present invention, alternative commercial solutions of hydrolysis products, and combinations thereof, can be used to supply a liquid reductant to effect reduction of NOx on the surface of the catalyst. Non-limiting examples of commercial solutions include solutions containing ammonium carbonate, ammonium bicarbonate, ammonium carbamate, ammonium cyanate, ammonium salts of organic acids, including, but not limited to formic and acetic acid, and cyanuric acid.

During the start up time period and after cold start of a vehicle, at least one embodiment of the present invention provides a method and system of rapidly thawing liquid reductant so that it is available at a suitable pressure and quantity for dosing after the start up time period elapses.

Figure 2A:
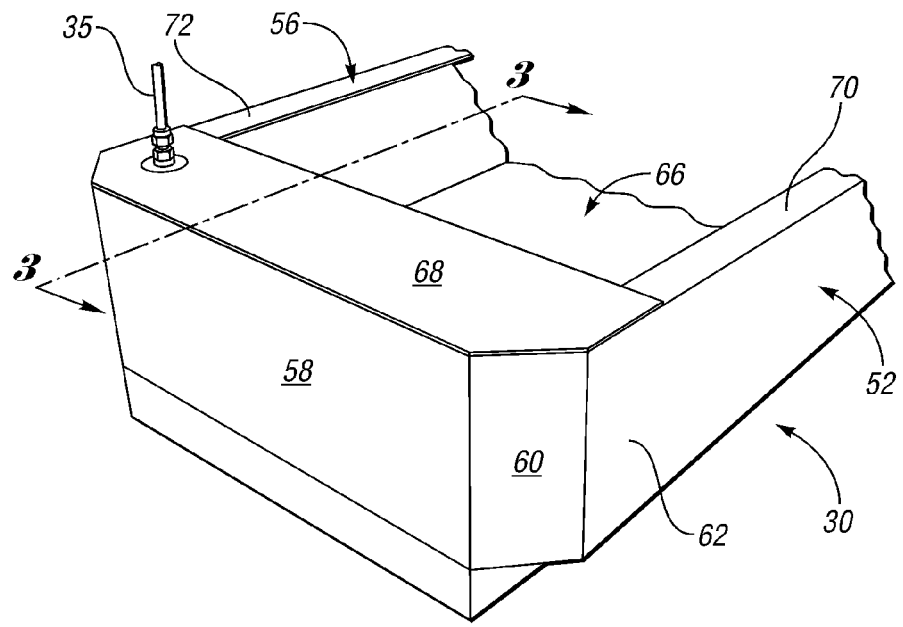
FIGS. 2a and 2b are perspective fragmented views of a reductant tank according to one embodiment of the present invention.
Figure 2B:
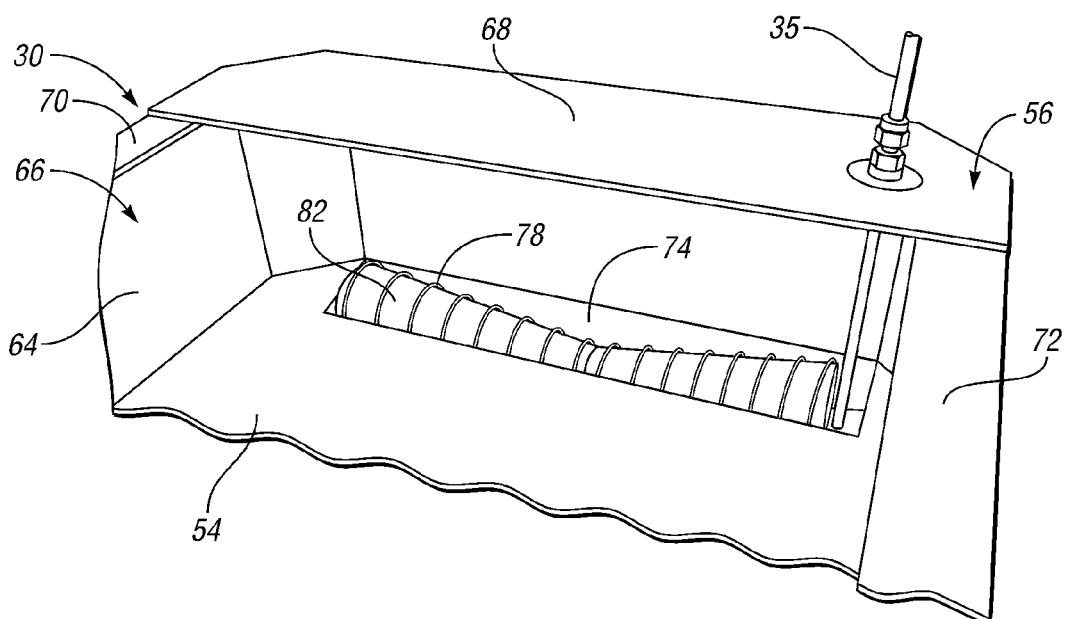

Turning to FIGS. 2a and 2b, reductant tank 30 for holding liquid reductant is shown according to one embodiment of the present invention. In at least one embodiment, the reductant tank 30 is constructed of plastic, metal or metal alloy.

The reductant tank 30 generally includes a side wall 52, tank bottom 54, upper lip 56, and tank cover (not shown). Side wall 52 includes front wall 58, angled front corner wall 60, rear wall (not shown), and opposing lateral walls 62 and 64. Front wall 58 and the rear wall are substantially parallel to and offset from each other. Opposing lateral walls 62 and 64 are offset from each other. Lateral wall 62 extends between angled front corner wall 60 and rear wall 60, while lateral wall 64 extends between the front wall 58 and the rear wall. Side wall 52 and tank bottom 54 help to define a reductant cavity 66 for holding liquid reductant.

Upper lip 56 includes front lip 68, rear lip (not shown, and opposing lateral lips 70 and 72. The upper edges of side wall 52 are attached by soldering or other means known to those skilled in the art.

Figure 3:
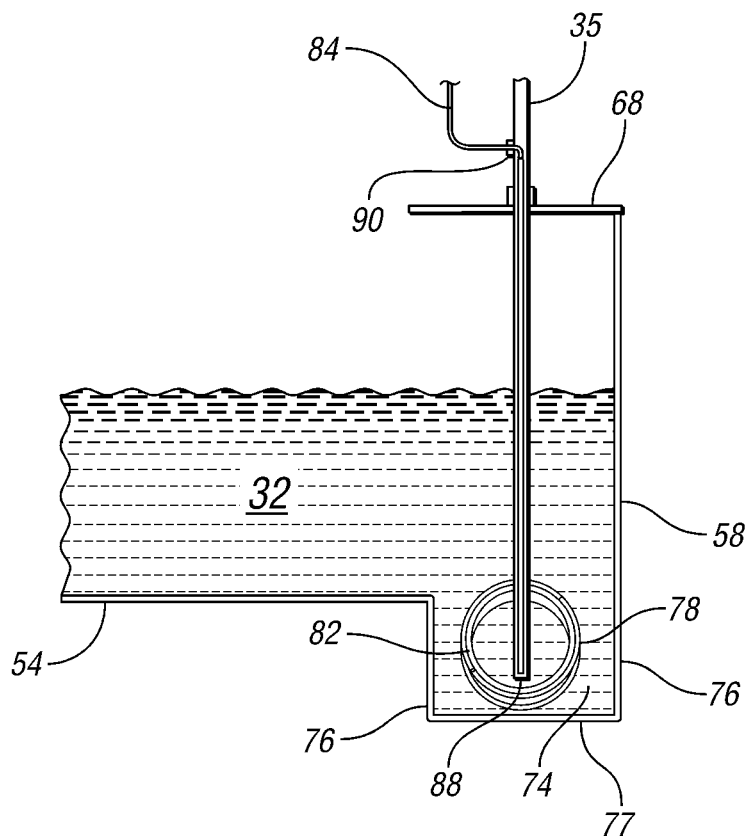
FIG. 3 is a cross-sectional view of the reductant tank of FIGS. 2a and 2b taken along line 3-3.

Reductant tank 30 also includes a sump cavity 74 which is partially enclosed by peripheral sump walls 76 and sump bottom 77. As shown in FIGS. 2 and 3, sump cavity 76 is situated adjacent to the front end of reductant tank 30 such that one of the peripheral sump walls 76 and the front outer wall 58 forms a continuous wall structure. In other embodiments, the sump cavity is situated adjacent to the rear end of the reductant tank, or alternatively, at a middle position of the reductant tank. The sump cavity can extend less than, equal to, or greater than the width of the reductant tank; and/or the sump cavity can extend less than, equal to, or greater than the length of the reductant tank, as long as the resulting reductant tank includes a tank bottom portion.

A first cable heater 78 is at least partially situated in sump cavity 74. The first cable heater 78 is in direct contact with frozen reductant during the rapid thawing operation. In at least one embodiment, the cable heater is a Watlow cable heater available from Watlow Electric Manufacturing Company of St. Louis, Mo. A first heating control unit 80 can be programmed to selectively power first cable heater 78 to deliver a power level based on the demand for liquid reductant, which can reach an instantaneous power level of up to 360 Watts. In at least one embodiment, the first cable heater 78 is spirally wound around the outside diameter of a relatively thin cylindrical metal sheet 82 having relatively good thermal conduction properties, such as stainless steel or other metal alloy having properties that are compatible with urea and/or other liquid reductant. In at least one embodiment, the cable heater is spirally wound around the inside diameter of the cylindrical metal sheet. The metal sheet 82 can be secured to one or more of the sump walls 76 and sump bottom 77.

A second cable heater 84 can be situated within a portion of the suction side 35 of liquid reductant supply line 34, as depicted in FIGS. 1 and 3. The second cable heater 84 can be attached to the inner wall of the supply line 34 by any method known to one of ordinary skill in the art. The second cable heater 84 is in direct contact with frozen reductant during the rapid thawing operation.

In at least one embodiment, the second cable heater 84 extends proximate to the inlet 88 of suction side 35 of supply line 34 to a cable heater exit point 90. The exit point 90 is sealed by any method known to those skilled in the art such that liquid reductant does not leak from the exit point 90. In at least one embodiment, the second cable heater 84 is a Watlow cable heater available from Watlow Electric Manufacturing Company of St. Louis, Mo. A second heating control unit 92 can be programmed to selectively power cable heater 84 to deliver a power level based on the demand for liquid reductant, which can reach an instantaneous power level of up to 360 Watts.

In at least one embodiment of the present invention, the first and second cable heaters 78 and 84 can be utilized to provide adequate liquid reductant supply under cold start conditions by rapidly thawing frozen reductant in and around the suction side of the supply line 34 (first cable heater 78) and within and proximate to the sump cavity 74 (first and second cable heaters 78 and 84). In at least one embodiment, only one of the first and second cable heaters 78 and 84 are utilized to provide adequate liquid reductant supply under cold start conditions.

Due to the direct contact of the first and/or second cable heaters 78 and 84 with the frozen reductant, a higher efficiency of converting electrical power into heat can be achieved in comparison to indirect heating techniques, such as heating hoses. Moreover, a higher current can be supplied to the first and/or second cable heaters 78 and 84 relative to heating hoses because of the direct contact of the cable heaters to the frozen reductant. Further, in at least one embodiment, the cable heaters do not have to be insulated, unlike typical heating hoses. For this reason, a relatively higher current can be supplied to the cable heaters because overheating of the insulating material of a typical heater hose is not a concern.

It should be appreciated that the rapid thawing feature can be combined with any known bulk heating technique, such as providing heated coolant within wall cavities or a coolant tube situated within a reductant cavity, or with a gradual line heating technique, such as heating hoses.

Figure 4:
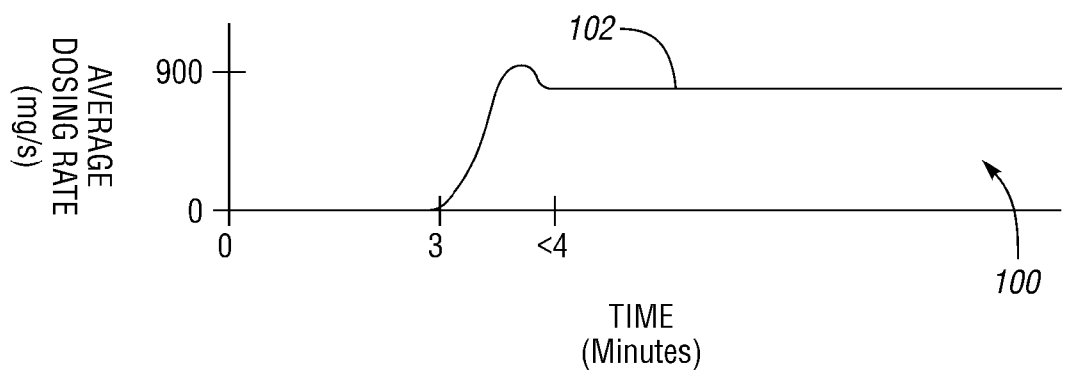
FIG. 4 is a graph depicting the results of a example conducted in accordance with an embodiment of the present invention.

FIG. 4 depicts a graph 100 showing the results generated from an example utilizing a rapid thaw feature according to an embodiment of the present invention. According to the example, 6400 grams of urea were charged to reductant cavity 66 and frozen to −40° C. to simulate cold start conditions of a vehicle. At time zero (0), the pressure of the frozen urea was 0 psi. During the first three (3) minutes of the test, the first and second cable heaters 78 and 84 were controlled by the first and second heating control units 80 and 92 such that a total continuous average of 250 W was supplied to rapidly heat a portion of the frozen reductant in the reductant tank 30. It should be appreciated that higher amounts of power can be supplied based on the vehicle system, e.g. heavy duty trucks, utilized with the present invention. After three (3) minutes elapsed, the reductant pump 38 was turned on. Curve 102 depicts the dosing rate of liquid reductant as a function of time. The use of the first and second cable heaters 78 and 84 provides a dosing rate of up to 900 mg/s of liquid urea in less than four (4) minutes from a cold start, which is sufficient for certain vehicle applications, for example, light duty vehicles.

As required, detailed embodiments of the present invention are disclosed herein. However, it is to be understood that the disclosed embodiments are merely exemplary of an invention that may be embodied in various and alternative forms. While embodiments of the have been illustrated and described, it is not intended that these embodiments illustrate and describe all possible forms of the invention. Rather, the words used in the specification are words of description rather than limitation, and it is understood that various changes may be made without departing from the spirit and scope of the invention.

In accordance with the provisions of the patent statute, the principle and mode of operation of this invention have been explained and illustrated in its various embodiments. However, it must be understood that this invention may be practiced otherwise than as specifically explained and illustrated without departing from its spirit or scope.

What is claimed:

1. A method for delivering liquid reductant to a selective catalytic reduction (SCR) system, the method comprising:
   detecting a cold start condition of a vehicle having a SCR system;
   determining a thawing period based on a catalyst temperature at the cold start condition and a minimal operating temperature for the catalyst;
   during at least a portion of the thawing period, rapidly thawing frozen reductant contained within a reductant tank of the SCR system to obtain thawed liquid reductant; and
   delivering the thawed liquid reductant for use in the SCR system.

2. The method of claim 1, wherein the thawing period is between 1-5 minutes.

3. The method of claim 1, wherein the liquid reductant is urea.

4. The method of claim 3, wherein the delivering step includes dosing ammonia to the catalyst after the thawing period elapses.

5. A method for delivering liquid reductant to a selective catalytic reduction (SCR) system, the method comprising:
   detecting a cold start condition of a vehicle having a SCR system;
   determining a thawing period based on the rapid urea decomposition rate at the cold start condition and a minimal operating temperature for the liquid reductant;
   during at least a portion of the thawing period, rapidly thawing frozen reductant contained within a reductant tank of the SCR system to obtain thawed liquid reductant; and
   delivering the thawed liquid reductant for use in the SCR system.

* * * * *